United States Patent [19]

Iwao

[11] 4,195,423

[45] Apr. 1, 1980

[54] POP-UP CASH REGISTER

[75] Inventor: Noriaki Iwao, Tokyo, Japan

[73] Assignee: Tomy Kogyo Co., Inc., Tokyo, Japan

[21] Appl. No.: 937,924

[22] Filed: Aug. 30, 1978

[51] Int. Cl.$^2$ .............................................. G09B 19/02

[52] U.S. Cl. ....................................... 35/30; 235/1 E; 35/9 R

[58] Field of Search ................ 46/39; 235/1 E; 35/30, 35/9 R, 31 R, 6, 5, 75

[56] References Cited

U.S. PATENT DOCUMENTS

| | | | |
|---|---|---|---|
| 964,026 | 7/1910 | Jacobs | 46/39 |
| 1,351,608 | 8/1920 | Barry | 35/75 |
| 1,629,635 | 5/1927 | Parsons | 35/9 R |
| 2,775,826 | 1/1957 | Vawter | 35/9 R |
| 3,535,796 | 10/1970 | Dean | 35/9 R |

FOREIGN PATENT DOCUMENTS

| | | | |
|---|---|---|---|
| 315625 | 10/1956 | Switzerland | 46/39 |
| 1225173 | 3/1971 | United Kingdom | 46/39 |

*Primary Examiner*—John W. Shepperd
*Attorney, Agent, or Firm*—Staas and Halsey

[57] ABSTRACT

A toy cash register device which closely simulates the operation of an actual real life cash register having a plurality of program plates depicting thereon various items of merchandise and monetary values therefore with each plate having a total value for each grouping of items thereon. The device is entirely actuated and operated by tensioned springs and no other source of power is required for actuating thereof. An OPEN button releases a cash drawer for positive opening under other spring mechanism. Coordinated with a program plate inserted into the device are latching pawls associated with respective monetary keys. Each program plate is provided with precoded channels along respective edges thereof which in cooperation with the latching pawls require operation of correct keys before a "ring up" occurs and simultaneously therewith a ding of an internal bell occurs. After all items on a given program plate have been rung up and the totalization value appears in a viewing window, pressing of the OPEN button will simultaneously effect an ejection of the program plate in a "Jack-in-the-Box" fashion, ring the internal bell for a period of time, and simultaneously open the cash drawer. Also, along with this action a "THANK YOU!" sign will appear in the viewing window of the device.

10 Claims, 8 Drawing Figures

POP-UP CASH REGISTER

BACKGROUND OF THE INVENTION

1. Field of the Invention

The present invention is directed to a toy cash register having a program plate provided with replicas of merchandise thereon and dollar values therefore which will effect control of the operation of the toy cash register in a manner similar to that of a real cash register.

2. Description of the Prior Art

Often times toys are made to resemble, at least in appearance, their life sized counterparts. However, in most cases the toys do not very closely simulate or function like the real-life counterpart. This is especially true in such devices as toy cash registers and the like.

Known type cash registers in toy configuration have miniature keys and often will permit opening and closing of a cash drawer. However, known type toy cash registers fail to provide or duplicate the many other features of the large actual cash registers which they are designed to resemble.

SUMMARY OF THE INVENTION

The pop-up cash register of the present invention closely depicts the operation of an actual cash register. It effects a bell ringing each time a key is depressed, and also provides an increased volume bell ringing action after the sum total of items rung up is reached and the cash drawer is opened. Also, after the sum total is rung up and when the cash drawer is opened by depressing an "OPEN" button, simultaneously therewith a pop-up ejection occurs.

In addition, the toy cash register of this invention performs an educational function. Program plates having depicted thereon pictures or replicas of merchandise coordinated with dollar and cent values therefore, together with a total sum of all the items and their money values including programmed channels associated therewith are provided for controlling the operation of the toy register. Thus, a child or other operator of the toy cash register, can actually key-in dollars and cents as indicated on a program plate which has been inserted into the cash register, and this toy/educational device is arranged so that correct values must be inputted to effect operation of the device. That is, if an incorrect value key is depressed, or a number of incorrect keys for a desired sum total are depressed, the device will not funciton, i.e. the values will not be entered. Thus, through sight and sound association, a child can learn correct values of addition while playing with the toy cash register of this invention.

A program plate has at least four program channels provided therewith, with two channels along one side of the program plate and two more channels along the other side thereof. Each program channel being provided with obstructions permanently therein to correspond with the pre-printed pictorial matter fastened or applied to the center surface poriton of the program panel between the parallel program channels. A plurality of said program plates are normally provided to enable an operator of the toy cash register a variety of types of merchandise and species thereof to be rung up in the device.

A traverse plate is provided for moving under pressure a program plate inserted into a guide channel associated with the device, a spring connected between the traverse plate and a portion of the toy cash register frame, and latching means associated with the program plate to prevent movement thereof until an associated key is depressed.

To add interest and excitement to the device, a pop-up feature is also provided. This feature involves forceably ejecting the program plate from the toy after the sum total has been reached and when the OPEN button is depressed for the cash drawer, which then is automatically opened. Simultaneously the totalization bell rings and a "THANK YOU!" appears in view of the operator. Much in the manner of a "Jack-in-the-Box" which always excites young and old, this pop-up ejection of the program plate together with the bell ringing and appearance of the "THANK YOU!" sign in the cash register window creates extra excitement and pleasure for an operator whether child or adult.

An object of the present invention is to provide a toy cash register device which simulates an actual cash register in manner of use and operation.

A further object of the present invention is to provide a toy cash register device having a plurality of pre-programmed plates for use therewith, each pre-programmed plate having thereon pictures of items of merchandise together with dollar and cent values therefore, together with a sum total of all items depicted on a single panel of the plate. Each plate may have both front and back surfaces provided with the merchandise pictures. Program channels are provided along the edges of the plate for controlling the operation of the cash register device.

A still further object of the present invention is to provide a toy cash register which has an educational function in that operation thereof only will occur when correct keys or combination of keys are depressed under the control of a pre-programmed plate depicting items/values of merchandise.

Another further object of the present invention is to provide a toy cash register device having a cash drawer which is positively opened by spring structure within the device when a sum total of merchandise has been reached and an OPEN key depressed. Simultaneously with the opening of the cash drawer, a bell rings, and a pre-programmed plate is forceably ejected in a pop-up manner. Then a "THANK YOU!" sign appears in a window of the cash register for easy veiwing by an operator of the device.

DESCRIPTION OF THE PREFERRED EMBODIMENT

Figure 2:
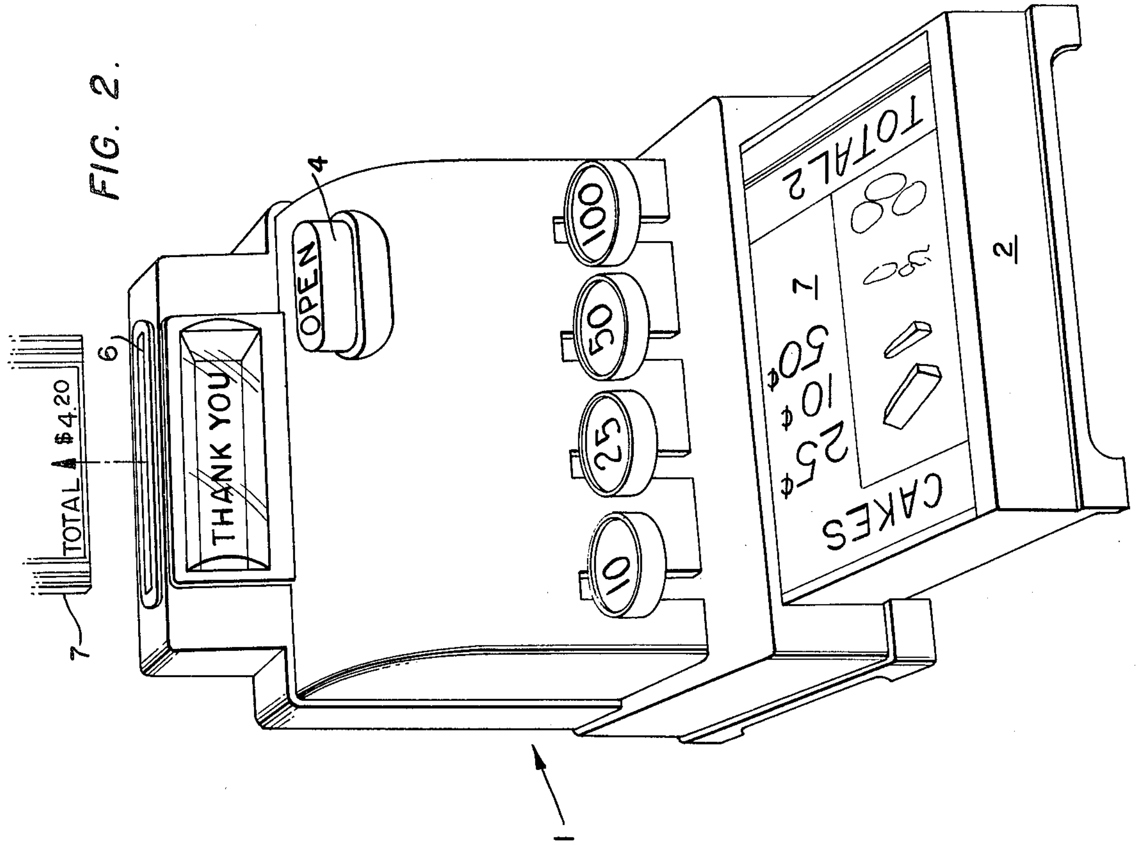
FIG. 2 is a perspective view of the toy cash register of this invention just after all items of merchandise have been totaled, the OPEN button has been depressed, and with the program plate being ejected and the cash drawer being opened.

A preferred embodiment of the invention will now be described by reference to the figures of the drawing. Looking at FIGS. 1 and 2, the basic structure of the toy cash register may be seen. Reference numeral 1 indicates the device, which is provided with a cash drawer 2, operating keys 3*a*, 3*b*, 3*c* and 3*d* which may have any predetermined value of money printed thereon or formed therein in the case of for example, plastic keys. In the present showing, U.S. values of ten cents, twenty-five cents, fifty cents, and one dollar respectively are provided on these keys.

An OPEN key 4 is provided which when depressed, will effect positive opening of the cash drawer. Furthermore, if the total number of items on a given program plate have been already "rung up" by an operator of the device by depressing the correct keys 3*a*–3*d*, then the plate will be ejected. Simultaneously, a bell will be rung, and a "THANK YOU!" will appear in the window 5. Reference numeral 6 indicates a slot at the top of the device into which a program plate is inserted. A plurality of different program plates are normally provided with each toy cash register.

Figure 3:
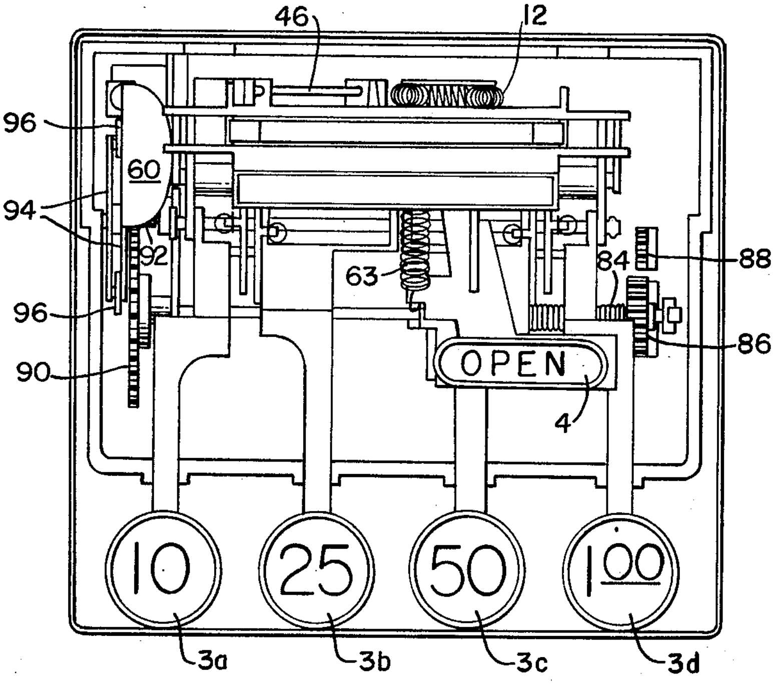
FIG. 3 is a top plan view with the upper cover omitted.
Figure 4:
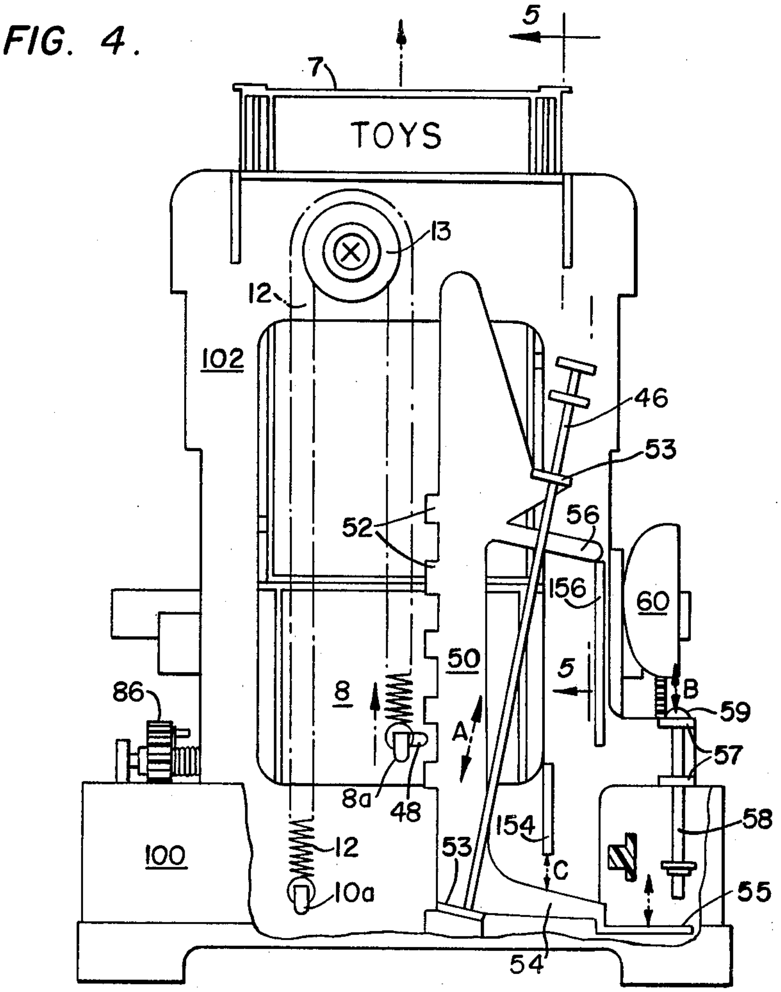
FIG. 4 is a rear elevational view with the cover omitted.

Looking at FIGS. 3 and 4, the operating mechanism of the device may be seen, in these figures the outside cover which normally encloses the upper portion of the device has been omitted. A base 100 has provided thereon a vertical support 102. The device is preferably made of plastic with the base 100 being formed thereof. The vertical support portion 102 consists of separate pieces which are assembled together and then inserted into the base. Conventional fabrication techniques are used in forming these parts. The vertical support portion 102, preferably formed of several basic components, when assembled provides a vertical channel 6 for reception of the program plates 7. Also mounted within this channel is an actuating traverse plate 8 provided with a pin 8*a* extending rearwardly therefrom for attachment of one end of spring 12. Spring 12 in turn passes around a direction changing pulley 13 and the other end thereof is attached to a pin 10*a* provided on the rear portion of the vertical support structure 102.

A slide rod 46 is mounted upon suitable support projections provided on the rear of the vertical support structure 102. As can be seen in FIG. 4, this slide rod 46 diverges at an angle from the vertical center line of the device. A slide plate 50 is supported by means of right angle projections 53 upon this diverging rod 46. Suitable apertures are provided in the projection 53 slightly larger in size than the diameter of rod 46 to permit this sliding function as indicated by the double headed arrow A. Protrubances 52 are also provided on the slide plate 50, as well as a projecting arm 54 with a horizontal plate 55 integrally therewith. The purpose of the horizontal plate 55 is to engage the end of a pin hammer 58. This pin hammer 58 is suitably mounted in apertures provided in the projections 57 also integral with the vertical support structure 102. The pin hammer 58 is provided with an enlarged head portion 59 which in turn strikes the bell 60 when moved in the upward direction as indicated by the double headed arrows B. Thus, as can be easily visualized, each time the slide plate 50 moves upwardly with corresponding upward movement of horizontal plate 55, the lower end of the pin hammer 58 will be engaged, thus lifting same with a sharp upward movement into striking engagement with bell 60, and thus ringing same. An extending projection 48 mounted on the back of traverse plate 8 will engage with the respective protrubances 52 on slide plate 50 each time the traverse plate 8 moves vertically upwardly. This movement occurs in a step by step manner as determined by the control abutments 72 of a program plate inserted in the channel 6 of the support structure 102. Each time the projection 48 engages with the next protrubance 52 and lifts the slide plate 50 vertically, the slide plate 50 also moves to the right as seen in FIG. 4 along slide rod 46 until the projection 48 disengages from the respective protrubance 52. Thus, a bell ringing function is effected each time a correct key, or proper combination of keys are depresssed in order to permit the associated program plate movement upwardly to the next program abutment, to be described below. Thus, a single ding of the bell 60 occurs for each correct key ring up. A stop 154 provided on the support structure 102 limits total upward movement of slide plate 50 by means of engagement with the portion 54 of the slide plate. Double headed arrow C indicates this movement. Another projection 56 also mates with a limit stop 156 in similar manner to limit the downward movement of the slide plate 50.

Figure 5:
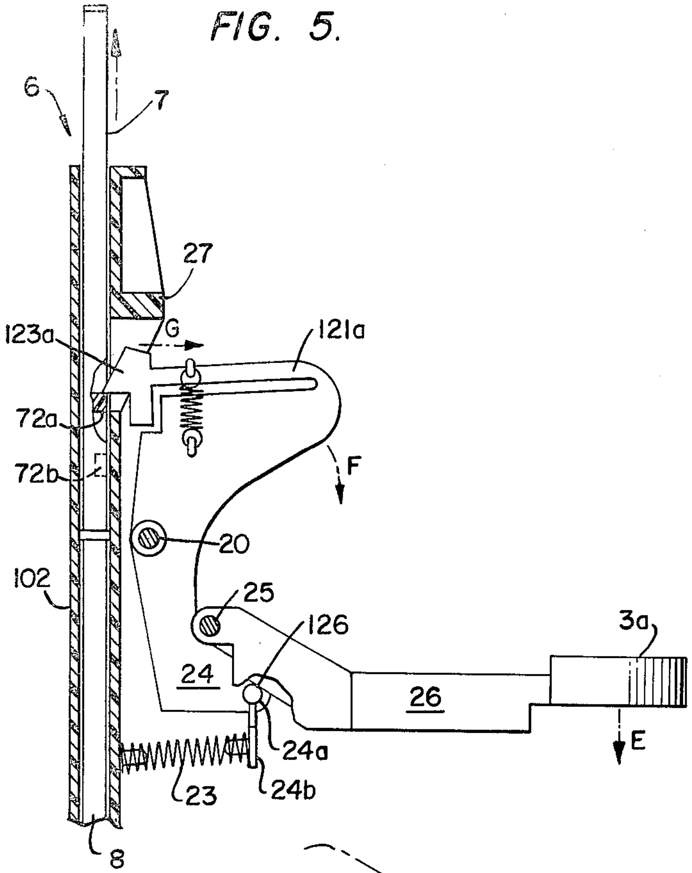
FIG. 5 is a side elevational view, partly in cross section, showing a single cash register key and a latching pawl associated therewith which cooperates with preprogrammed abutments in a program channel of a program plate.

Looking at FIGS. 5–7, the individual program plate structure and associated latching pawl structure will be described in detail. As seen in FIG. 5, a program plate 7 has been inserted into the channel 6 of the support structure 102 and moved downwardly against traverse plate 8 to tension the spring 12. Latching pawls 123*a*, 123*b*, 123*c*, and 123*d* respectively normally project into the areas of the program plate side channels 7*a*–7*d*. Each of the respective pawls are provided with an upward tapered surface to permit ready and easy insertion of a program plate into channel 6 and past the pawls, but the sharp pointed lower edge portion of each pawl preventing upward movement of the program plate when in engagement with a suitable abutment 72*a*, 72*b*, 72*c*, or 72*d* as provided in the program plate side channels. Each pawl 123 is suitably mounted on a flexible arm 121 from the main latching plate 21. Each latching plate 21 is provided with a suitable bearing portion 221 which is provided with a central aperture therethrough for pivotally mounting upon shaft 20. Shaft 20 being in turn suitably supported from support portions 120 provided on the vertical support structure 102 (See FIG. 7). Each flexible portion 121 of the latching structure is tensioned by a small spring 91. The spring 91 provided for each of the latching pawl key plates 21 maintains the tips of the latching pawls in a normally horizontal position. However, whenever a respective tip engages with an abutment 72 o. a program plate, the respective spring 91 will permit a slight upward movement of the pawl and allow flexibility of operation thereof.

Figure 1:
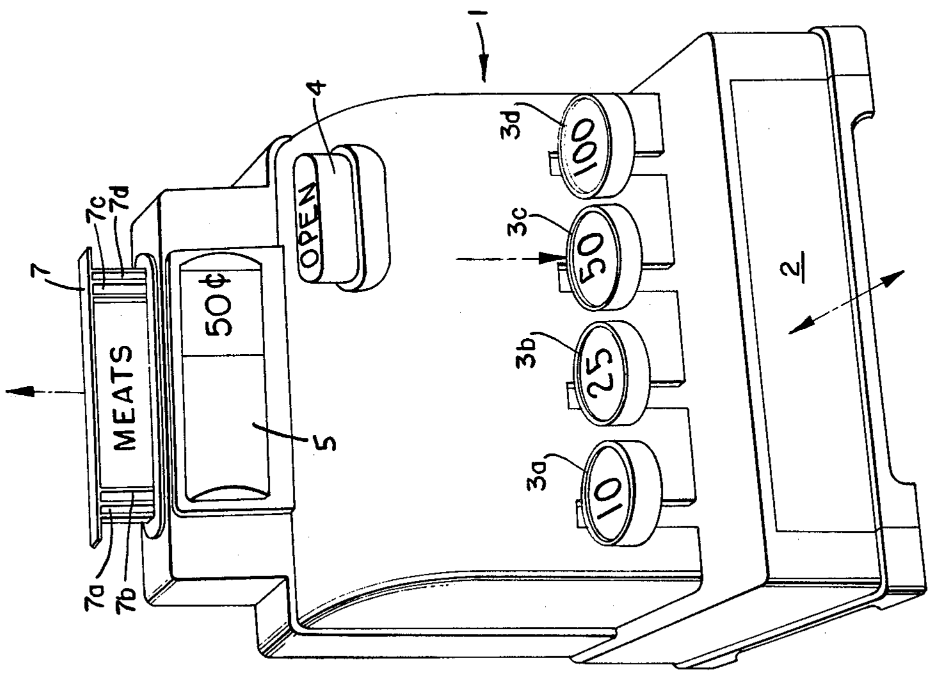
FIG. 1 is a perspective view of the toy cash register of this invention with a program plate almost fully inserted therein.

Each pawl latching plate 21 is provided with a lower portion 24 configured as shown having both a projecting pin 24*a* and a projecting right angle plate 24*b* integral therewith. Suitable projections on the plates 24*b* and on the support structure 102 maintain bias springs 23 in place for their respective latching pawl plates 21. A support shaft 25, suitably mounted on the support structure 102 by integral projections 125 support the plurality of keys for pivotable movement. In the four key device shown, the first key 3*a* having the money value of ten cents is shown as mounted for pivotable rotation upon shaft 24. A portion 126 of each key engages with the respective pins 24 as provided on each of the pawl key latching plates 21. Thus, each of the springs 23, in this example four in total number, will keep the respective keys 3*a*–3*d* in the normal horizontal position as best seen in the views of FIGS. 1, 2 and 5. However, when a key is depressed, the key member 26 will move downwardly as indicated by arrows E in FIGS. 5 and 7 to actuate the latch pawl plate 21 in the direction F of FIG. 5.

Figure 6:
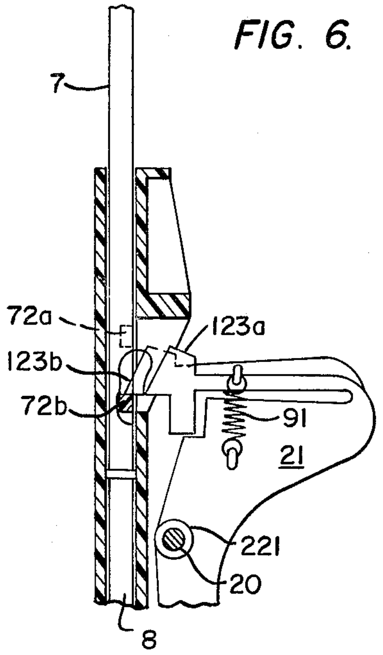
FIG. 6 is a partial portion of two adjacent latching pawls in operating cooperation with a program plate.
Figure 7:
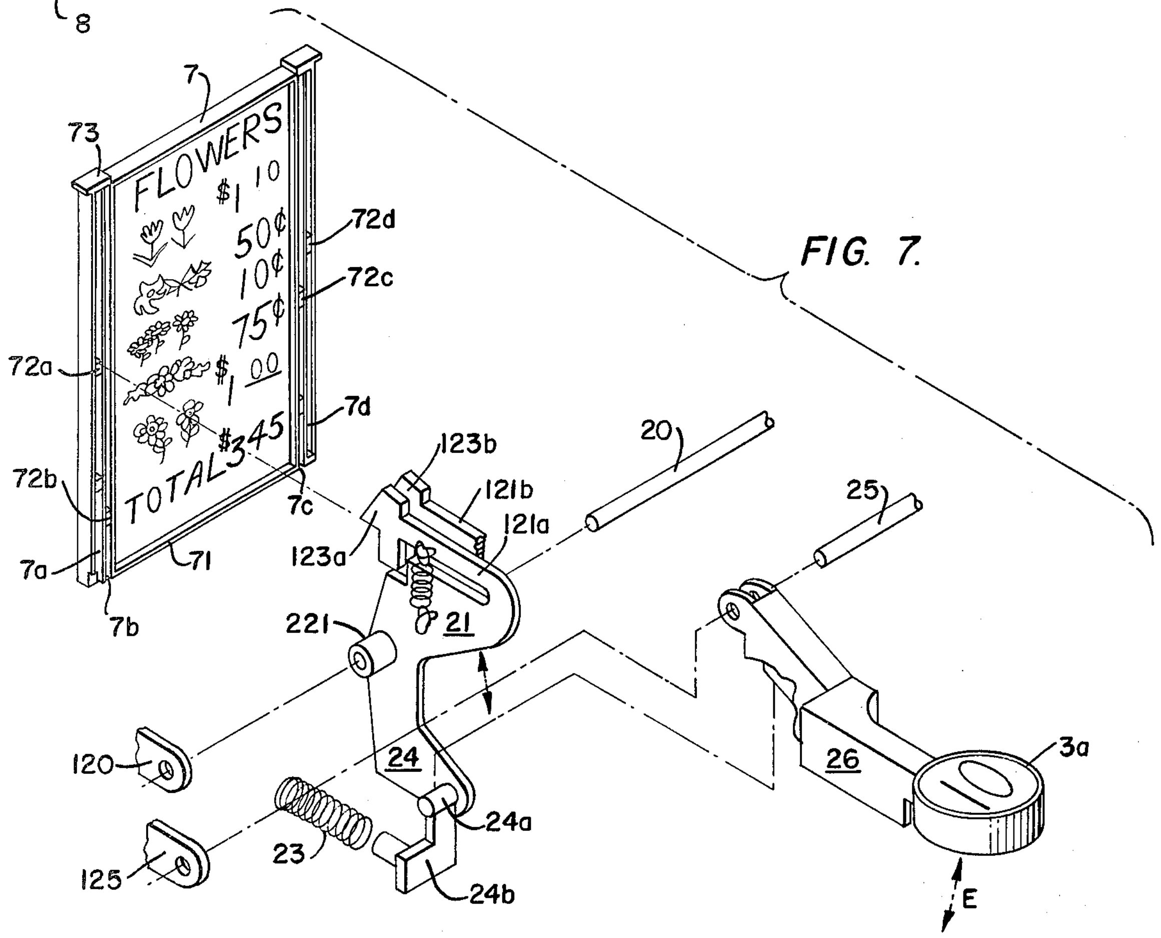
FIG. 7 is a perspective view in exploded form, showing a single key, the associated latching pawl, the next adjacent latching pawl, and a program plate.

In the examples of FIGS. 5 and 6, the latch pawl 123*a* is in engagement with the abutment 72*a* as shown in FIG. 5. Another abutment in the next program channel 72*b* is indicated in dotted lines in FIG. 5. When key 3*a* is depressed, latch pawl 123*a* will be moved towards the right as indicated by arrow G in FIG. 5. When the latch pawl 123*a* is moved to the far right as shown in FIG. 6, the program plate 7 will be moved vertically upwardly because of the traverse plate A and spring 12 until latch pawl 123*b* engages with the obstruction 72*b* in program plate channel 7*b*. At this point, the vertical upward movement of program plate 7 will be stopped. Thus, as can be readily visualized, only when the correct key is depressed, will the proper latching pawl be disengaged from its respective program channel abutment. Of course, if two keys are needed for a correct total value such as twenty-five cents and fifty cents for the value of seventy-five cents, appropriate abutments 72*b* and 72*c* will have been provided in the channels 7*b* and 7*c* of the program plate and thus both keys will necessarily have to be depressed in order to remove both latching pawls 123*b* and 123*c* from engagement with their corresponding abutments. This simple, yet effective structure provides the very important feature of requiring correct ring up for each item of merchandise before the next item will appear in the viewing window for an operator. Thus, while being a fun toy, it is also a very educational one.

Figure 8:
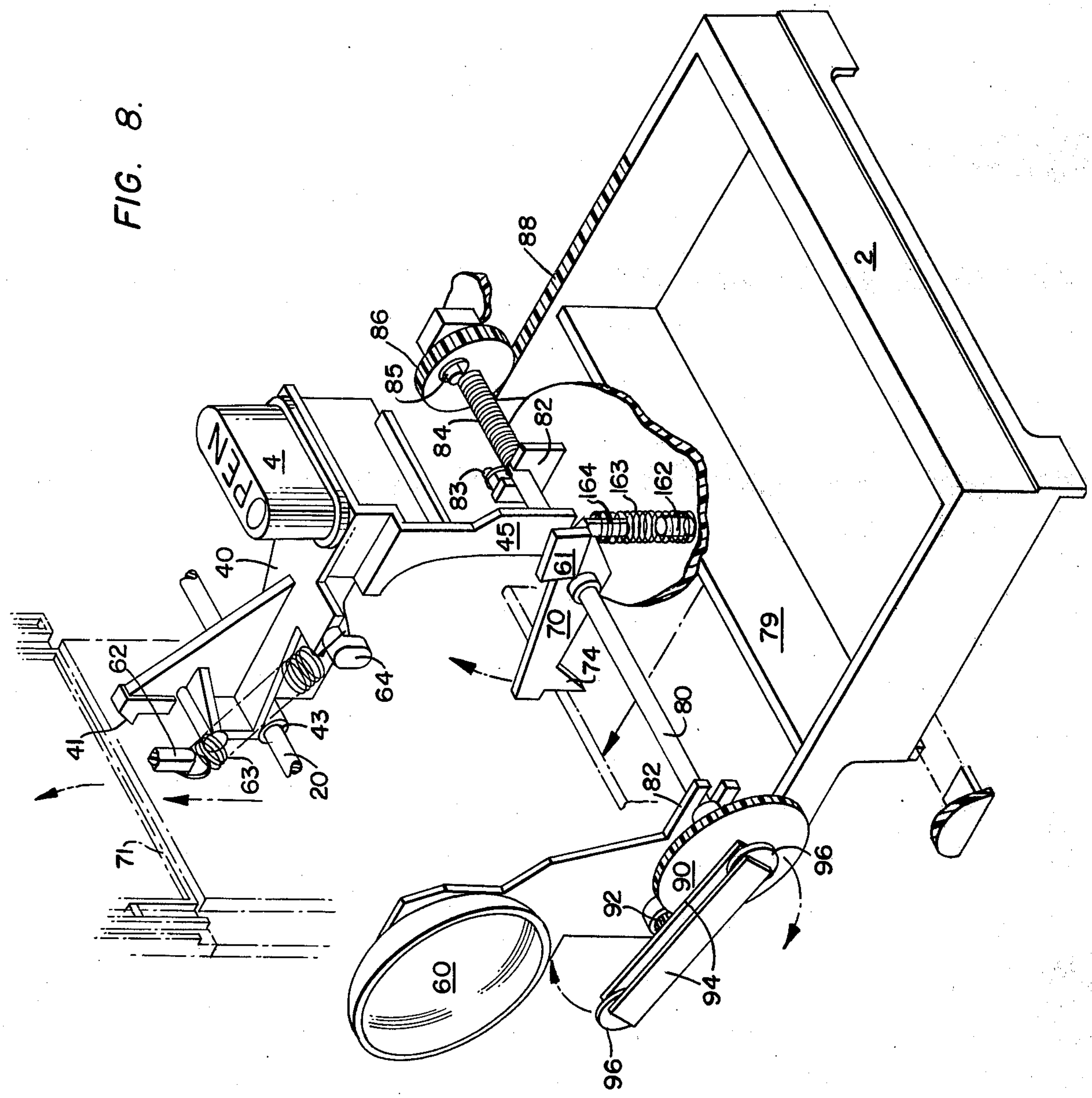
FIG. 8 is a perspective view of the cash drawer in open position, together with the bell ringer mechanism and with most of the supporting frame structure omitted.

The bell 60 also is utilized for a long ringing cycle whenever the OPEN button 4 is depressed with simultaneous opening of the cash drawer and ejection of the program plate if merchandise totalization has been effected. The mechanism for accomplishing this is best seen in the perspective of FIG. 8. The "OPEN" button 4 is mounted upon a pivot member 40 having provided at the opposite end thereof with a pawl 41. The pivot member 40 is also provided with a bearing aperture 43 therethrough for mounting thereof upon the same shaft 20 as the key pawl plate members are mounted. A spring 63 is attached between a pin 62 on the vertical support 102 and a pin 64 on the pivot member 40 to bias this member in the locking position of pawl 41. Pawl 41 will engage a suitable projecting lip 71 on the lower portion of each program plate when the plate moves upwardly to the totalization position thereof. Thus, after all the proper money value keys 3*a*–3*d* have been correctly depressed and the program plate is in the upmost totalization position for the total times rung up, the pawl 41 will retain the plate in this final position. Then, when the OPEN button 4 is depressed, member 40 will be rotated about shaft 20 against the bias tension of spring 63, and the pawl 41 will be removed from blocking engagement with the botton lip 71 of a program plate, and at this point the program plate will be completely released. Then because of traverse plate 8 and the remaining tension of spring 12, it will be forceably ejected upwardly in a "pop-up" manner. This of course, creates excitement similar to a "Jack-in-the-Box" type device for an operator of the register. Simultaneously with the ejection of the program plate, the transverse plate 8 will move to the top position within the guide channel 6 in support structure 102. The front side of the traverse plate 8 preferably is provided with wording such as "THANK YOU!" which then becomes visible in the viewing aperture 5 for easy reading by an operator.

A projection portion 45 provided on member 40 and almost directly below the OPEN button 4 is designed for engagement with the cash drawer latch plate 70. The cash drawer release pawl 74 is mounted on the other end of plate 70 which is freely pivotally mounted upon a shaft 80. Shaft 80 is mounted from the main base frame by supports 82 in a conventional manner. A projection 162 on the base frame retains one end of a bias spring 163, while the other end of the spring is retained by a projection 164 on pivot plate 70. A side extension 61 assures alignment of the projection 45 of the OPEN key member with the tip end of plate 70. Also mounted on one side of the shaft 80 is a coiled spring 84 having one end retained by a pin 83 on support 82. The other end of spring 84 is fastened to a pin 85 on the small gear 86. The teeth of gear 86 mate with rack teeth 88 provided on the cash drawer. Thus, as can be readily visualized, when the OPEN button is depressed, the pawl 41 permits the program plate (if at the total position) to be forceably ejected, and the pawl 74 being released from the panel 79 of the cash drawer permits the cash drawer to be automatically opened because of the coil spring 84, the gear 86 and the rack 88.

The gear 86 is pinned or secured to the shaft 80, so that when the spring 84 effects rotation of the gear 86 to open the cash drawer, it also positively rotates the shaft 80. Secured at the opposite end of the shaft 80 from the gear 86 is another larger gear 90 fixed to shaft 80. The gear 90 thus will turn whenever shaft 80 is rotated. Mating with the gear 90 is a small pinion 92 freely rotatably supported from the frame structure, and having secured thereto parallel support plates 94. These support plates 94 have pinned therebetween at each of the respective ends thereof metal discs 96. These metal discs 96 have enlarged central apertures therein slightly larger than the pins which retain them. Thus as the parallel plates 94 are rapidly rotated by means of the drive from shaft 80 to gear 90 and pinion 92, the discs 96 will move slightly outwardly because of centrifugal force and thus engage with the bell 60. This will create a relative long continuous ringing of the bell as the cash drawer is opened and the program plate is ejected in "pop-up" manner. Since the discs 96 are loosely mounted on their pivot axis they will move inwardly as necessary to bypass the bell after hitting same, and thus not be stopped from rotation thereby. Thus, the toy cash register of this invention will permit times to be rung up only by depression of the correct money key or keys, which when depressed in the correct manner, will permit the program plate to move upwardly to show the next item of merchandise in window 5 and also the corresponding dollar and cents amount therefore. Then, when the next correct key or keys are depressed, the program plate will once again move upwardly to show the next item of merchandise and the correct dollar figure. Upon completion of all of the items depicted on a program plate, in this example five items of merchandise, when the last item is added the total amount of all items will appear in the viewing window. Thus, an operator will have an informative correct amount of all items added appearing in the window. At this point, the educational part of the device ceases and everything is ready for the entertainment and excitement phase. Nothing further will happen until the OPEN key. When the OPEN key is depressed, then the program plate will be forceably ejected upwardly in a vigorous manner, the "THANK YOU!" sign will appear, the cash drawer 2 will be opened quickly and positively to the front, and the bell 60 will be rung for a substantial period of time. All of these occuring simultaneously add a great deal of excitement and suspense to the overall device.

While in FIGS. 1 and 2 of the drawings a program plate is shown having meats depicted thereon with a total sum therefore of $4.20, many other types of food merchandise, as well as other items of merchandise may be depicted on different program plates. For example, in FIGS. 5–7, a program plate depicting various types of flowers with the money values therefore and a total of $3.45 is shown. Program plates depicting merchandise such as toys, fruits, cakes, and the like are envisioned for the toy cash register of this invention. Normally, different items are depicted on both the front and back surfaces of a program plate with the program channels, preferably two along each of the side edges of the program plates, with corresponding abutments as described previously being provided. The size of the program plates normally are just slightly smaller than the interior of the cash drawer so that for storage purposes, the plates may be stored within the cash drawer, and with the cash drawer closed, form a compact item for shipping, distribution, and selling. Of course, for this function of the device to be available, the cash drawer must be openable by pushing the OPEN button without a program plate being in place. The aforedescribed mechanism is thus so designed.

Another important feature of the toy cash register of this invention is in the fact that all of the operating springs are tensioned and cocked by the operator of the toy. That is, no batteries, motors, or any other type of replaceable energy sources are necessary. This is a great advantage when toys are to be operated by young children and the like who may inadvertently leave them on and thus quickly run down the usual battery of such powered devices. Thus, in this invention by inserting the program plate into the device, the traverse plate with bias mechanism therefore is tensioned and cocked. Similarly, when closing the cash drawer, the spring for the positive operation and opening of the cash drawer as well as for ringing the bell in the loud signalling manner is also tensioned and cocked. The spring for the traverse plate also is used for actuating the signal bell each time an item is rung up. Thus, all of the moving mechanisms being operated by various spring structure, are tensioned and put into operating condition by the operator. A very important advantage in such a toy.

Thus, this invention provides both an accurate and correct educational feature as well as one of high entertainment and pleasure value.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An educational toy device comprising:

a base structure;

cover structure associated with said base structure for simulating the general appearance of a cash register;

a support panel structure provided with a channel and a viewing aperture therein mounted vertically upon the base structure;

a plurality of keys mounted on said support panel structure, each of said keys having money equivalent indicia provided thereon;

latching means operable by each key of the plurality of keys;

a program plate for reception in the channel of the support panel structure and depicting thereon items of merchandise with related money equivalent indicia together with a totalization value indicia of all the items so depicted;

precoded means relating to said money equivalent indicia provided on the program plate for engagement by said latching means to permit ringing up of items of merchandise only when one or more of the plurality of keys are depressed corresponding to the correct money value for the particular item of merchandise; and, traverse means energizable by insertion of the program plate into the channel for effecting movement of the program plate through the channel to permit said precoded means and said latching means to function.

2. An educational toy device as set forth in claim 1, together with means for signalling each time the correct money value for an item of merchandise as depicted on the precoded program plate is rung up by depressing correctly one or more of the money keys, and further means for permitting ejection of the program plate after the total of all items depicted thereon have been rung up.

3. An educational toy device as set forth in claim 1, together with a cash drawer mounted movably within the base structure;

pawl means for holding said cash drawer closed;

a button mounted on the support panel structure for operating said pawl means; and means for positively opening the cash drawer upon actuation of said button.

4. A toy device as in claim 3, together with a bell, means for effecting a single ding of the bell each time an item of merchandise is correctly rung up, and further means for effecting a short continuous ringing of the bell upon opening of the cash drawer.

5. The structure as set forth in claim 4, wherein the means for effecting the short continuous ringing of the bell includes a rotatable bell ringing support structure having two metal bell striking discs rotatable therewith, said discs being freely movable in a limited direction with respect to the bell ringing support structure, gear and spring mechanism mounted on the base structure and connected with the bell ringing support structure to rotate same when the cash drawer is opened.

6. The structure as set forth in claim 5, wherein the means for positively opening the cash drawer includes said gear and spring mechanism which further includes rack teeth along one edge of the cash drawer, a complementary gear rotatably mounted on the base structure mating with said rack teeth, a spring attached to said gear at one end and to the base structure at the other end for positively driving the gear for moving said cash drawer to the open position, and a locking pawl mounted in the base structure for normally holding the drawer in closed position and actuable by said button to permit the cash drawer to open under the effect of said spring.

7. An educational toy device as set forth in claim 1, wherein a plurality of said program plates are provided, each program plate being different and provided thereon with pictures depicting a different variety of merchandise with corresponding aligned money equivalent indicia therefore, said viewing aperture on said vertical support panel being provided so that the items of merchandise on a program plate are viewable one item at a time through said aperture as each item has its corresponding money value rung up by depressing the correct money equivalent indicia key(s) of said plurality of keys; said traverse means including a spring biased traverse member which has the spring tensioned when a program plate is initially inserted into the guide channel of the support panel structure for moving the program plate each time the correct total value for an item of merchandise as depicted on the program plate is rung up.

8. The structure as set forth in claim 7, together with a cash drawer slidably mounted in the base structure;

an OPEN button mounted on the support panel structure;

means for positively opening the cash drawer upon actuation of said OPEN button;

means for signalling each time an item of merchandise as depicted on the precoded program plate is rung up by depressing correctly an associated money key;

further means for signalling when the cash drawer is opened;

said further signalling means including a bell, and means for ringing said bell each time the cash drawer is opened.

9. The structure as set forth in claim 8, wherein the means for positively opening the cash drawer includes rack and gear structure, a spring connected with said rack and gear structure for positively moving the cash drawer to the open position when the associated OPEN button has been depressed, and said bell ringing means inlcudes a rotatably mounted bell striking disc actuated by said spring simultaneously with the opening of the cash drawer.

10. The structure as set forth in claim 9, together with further means for permitting a pop up ejection of the inserted program plate from the guide channel by the traverse member whenever the totalization of all items of merchandise as depicted thereon has been effected and the OPEN button has been depressed to open the cash drawer and ring the bell.

* * * * *